United States Patent
Kim et al.

(10) Patent No.: US 10,424,781 B2
(45) Date of Patent: Sep. 24, 2019

(54) CATHODE ACTIVE MATERIAL AND LITHIUM SECONDARY BATTERY COMPRISING THE SAME

(71) Applicant: LG CHEM, LTD., Seoul (KR)

(72) Inventors: Daehong Kim, Daejeon (KR); MinHee Lee, Suwon-si (KR); YounKyoung Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 130 days.

(21) Appl. No.: 15/663,035

(22) Filed: Jul. 28, 2017

(65) Prior Publication Data

US 2017/0331103 A1  Nov. 16, 2017

Related U.S. Application Data

(63) Continuation of application No. 13/864,717, filed on Apr. 17, 2013, now abandoned.

(30) Foreign Application Priority Data

Apr. 17, 2012 (KR) ........................ 10-2012-0039654

(51) Int. Cl.
| | |
|---|---|
| *H01M 4/36* | (2006.01) |
| *H01M 10/052* | (2010.01) |
| *H01M 4/505* | (2010.01) |
| *H01M 4/131* | (2010.01) |

(52) U.S. Cl.
CPC ......... *H01M 4/364* (2013.01); *H01M 4/505* (2013.01); *H01M 10/052* (2013.01); *H01M 4/131* (2013.01)

(58) Field of Classification Search
None
See application file for complete search history.

(56) References Cited

U.S. PATENT DOCUMENTS

| | | | | |
|---|---|---|---|---|
| 2003/0180616 | A1* | 9/2003 | Johnson | ............ C01G 45/1228 429/231.1 |
| 2004/0023113 | A1 | 2/2004 | Suhara et al. | |
| 2006/0051671 | A1 | 3/2006 | Thackeray et al. | |
| 2007/0099087 | A1 | 5/2007 | Mihara et al. | |
| 2009/0123842 | A1 | 5/2009 | Thackeray et al. | |
| 2011/0189544 | A1 | 8/2011 | Kim et al. | |
| 2011/0311869 | A1 | 12/2011 | Oh et al. | |
| 2012/0288764 | A1 | 11/2012 | Chang et al. | |

FOREIGN PATENT DOCUMENTS

| | | |
|---|---|---|
| JP | 2009-204286 A | 9/2009 |
| KR | 10-2007-0083550 A | 8/2007 |
| KR | 10-2007-0092385 A | 9/2007 |
| KR | 10-2011-0090026 A | 8/2011 |
| KR | 10-2011-0097719 A | 8/2011 |
| KR | 10-2011-0110729 A | 10/2011 |

OTHER PUBLICATIONS

Ferg et al. Journal of the Electrochemical Society, vol. 141, No. 11, p. L147, Nov. 1994.

* cited by examiner

*Primary Examiner* — Wojciech Haske
(74) *Attorney, Agent, or Firm* — Birch, Stewart, Kolasch & Birch, LLP

(57) ABSTRACT

Disclosed is a cathode active material comprising a combination of lithium manganese composite oxide with a spinel structure represented by the following Formula 1 and a specific oxide represented by the following Formula 2, the cathode active material having a broad potential region at 3.0 to 4.8V upon initial charge:

$$Li_xM_yMn_{2-y}O_{4-z}A_z \quad (1)$$

wherein $0.9 \leq x \leq 1.2$, $0 < y < 2$, and $0 \leq z < 0.2$;
M is at least one element selected from the group consisting of Al, Mg, Ni, Co, Fe, Cr, V, Ti, Cu, B, Ca, Zn, Zr, Nb, Mo, Sr, Sb, W, Ti and Bi; and
A is at least one monovalent or bivalent anion, $$y'Li_2M'O_3 \cdot (1-y')LiM''O_{2-z'}A'_{z'} \quad (2)$$

$0 < y' < 1$ and $0 \leq z' < 0.2$;
M' is at least one element selected form the group consisting of Mn, Sn and Zr having an oxidation number of +4;
M" is at least one element selected from the group consisting of Period I and II transition metals, including Ni, Mn and Co, which have a 6-coordination structure and are stable in a layered structure; and
A' is at least one monovalent or bivalent anion.
Disclosed is also a secondary battery comprising the cathode active material.

10 Claims, 1 Drawing Sheet

【FIG. 1】
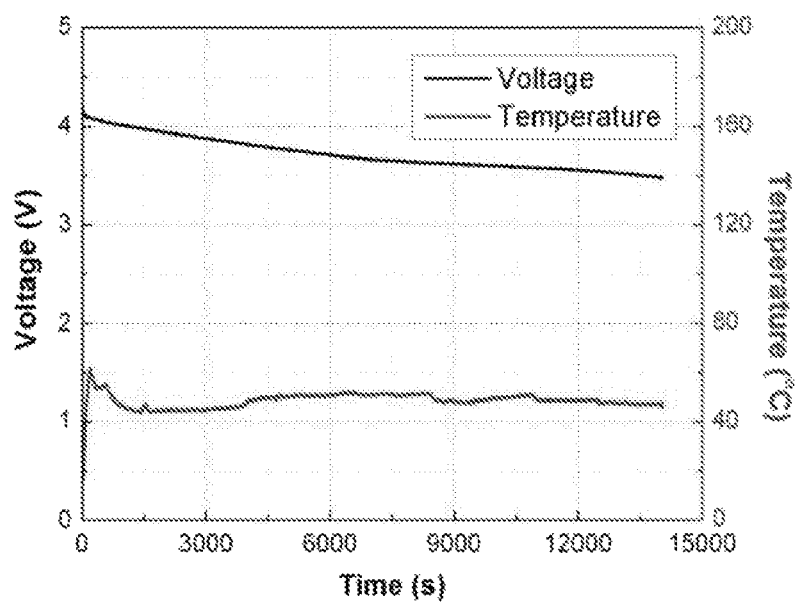
【FIG. 2】
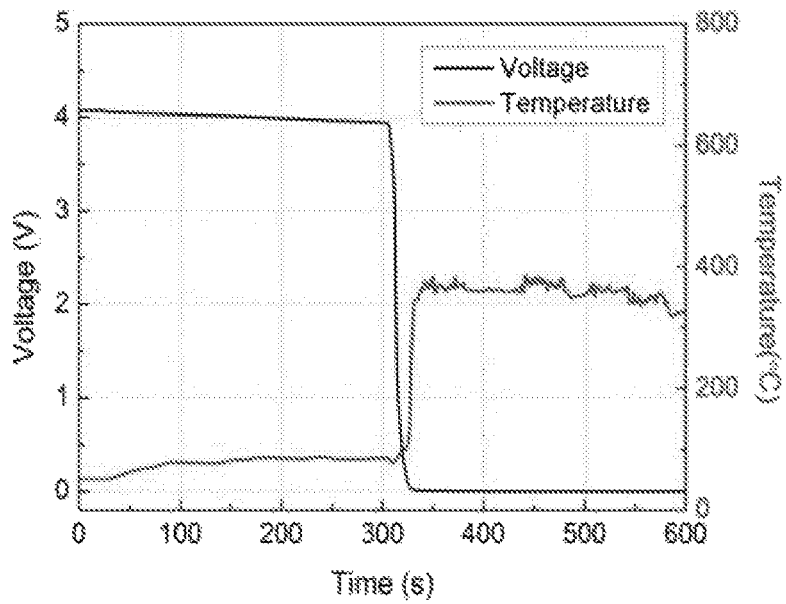

CATHODE ACTIVE MATERIAL AND LITHIUM SECONDARY BATTERY COMPRISING THE SAME

This application is a Continuation of U.S. application Ser. No. 13/864,717, filed on Apr. 17, 2013, which claims priority to Application No. 10-2012 0039654, filed on Apr. 17, 2012 in Korea, all of which are hereby incorporated by reference.

TECHNICAL FIELD

The present invention relates to a cathode active material and a lithium secondary battery comprising the same. More specifically, the present invention relates to a cathode active material which comprises a combination of two specific types of compounds and thus has a broad potential region at 3.0 to 4.8V upon initial charge.

BACKGROUND ART

Depletion of fuel cells has brought about a great increase in price of energy sources and increased interest in environmental pollution. Eco-friendly alternative energy sources are a necessity for the next generation. In this regard, a great deal of research into power production methods such as nuclear energy, sunlight, wind power and tidal power is underway and power storage devices for efficiently utilizing the produced energy also attract much attention.

In particular, regarding lithium secondary batteries, an increase in technological development and demand associated with mobile equipment has led to a sharp increase in demand for lithium secondary batteries as energy sources. Use of lithium secondary batteries as power sources of electric vehicles (EVs) and hybrid electric vehicles (HEVs) is becoming increasingly popular and usage thereof is expanding to applications such as power supply through grid implementation.

A conventional lithium secondary battery generally utilizes a lithium metal composite oxide for a cathode and a graphite-based compound for an anode. On the other hand, recently, rather than conventional carbon-based anode materials, a great deal of research associated with anode materials obtained through lithium alloy reactions using silicon (Si) and tin (Sn) and lithium titanium oxides is underway.

Lithium titanium oxide is known as a zero-strain material that suffers minimal structural deformation during charge/discharge, exhibits considerably superior lifespan, does not cause generation of dendrites and has considerably superior safety and stability.

However, lithium titanium oxide has a limitation of insufficient capacity as compared to conventional carbon-based anode materials, although it has a theoretical capacity of 175 mAh/g and an improved capacity to a level of 160 to 170 mAh/g to date.

Accordingly, there is an increasing need for methods capable of improving performance of secondary batteries by providing desired capacity and safety, in spite of using lithium titanium oxide as an anode active material.

DISCLOSURE

Technical Problem

Therefore, the present invention has been made to solve the above and other technical problems that have yet to be resolved.

As a result of a variety of extensive and intensive studies and experiments, the present inventors discovered that a battery having high capacity can be obtained by using a cathode active material prepared by combining a lithium manganese composite oxide having a specific spinel structure with a specific oxide. The present invention has been completed, based on this discovery.

Technical Solution

In accordance with one aspect of the present invention, provided is a cathode active material comprising a combination of a lithium manganese composite oxide with a spinel structure represented by the following Formula 1 and an oxide represented by the following Formula 2, the cathode active material having a broad potential region (potential plateau) at 3.0 to 4.8V upon initial charge:

$$Li_xM_yMn_{2-y}O_{4-z}A_z \qquad (1)$$

wherein $0.9 \leq x \leq 1.2$, $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion, $$y'Li_2M'O_3 \cdot (1-y')LiM''O_{2-z'}A'_{z'} \qquad (2)$$

$0 < y' < 1$ and $0 \leq z' < 0.2$;

M' is at least one element selected form the group consisting of Mn, Sn and Zr having an oxidation number of +4;

M'' is at least one element selected from the group consisting of Period I and II transition metals, including Ni, Mn and Co, which have a 6-coordination structure and are stable in a layered structure; and A' is at least one monovalent or bivalent anion.

The cathode active material according to the present invention comprises a combination of a lithium manganese composite oxide having a predetermined spinel structure and a specific oxide, thus maintaining high voltage during charge and discharge of batteries and exerting superior lifespan.

In the present invention, the oxide of Formula 1 may be represented by the following Formula 3:

$$Li_xNi_yMn_{2-y}O_4 \qquad (3)$$

wherein $0.9 \leq x \leq 1.2$, and $0.4 \leq y \leq 0.5$.

More specifically, the oxide of Formula 3 is $LiNi_{0.5}Mn_{1.5}O_4$ or $LiNi_{0.4}Mn_{1.6}O_4$.

In addition, the oxide of Formula 2 may be represented by the following Formula 4:

$$z'Li_2MnO_3 \cdot (1-z')LiM''O_2 \qquad (4)$$

wherein $0.5 < z' < 1$, and M'' is at least one element selected from the group consisting of Period I and II transition metals, including Ni, Mn and Co, which have 6-coordination structure and are stable in a layered structure.

Secondary particles of the oxide of Formula 1 may have a mean particle diameter (D50) of 2 to 30 μm, specifically 4 to 20 μm.

In the present invention, the mean particle diameter of the oxide means specifically secondary particle diameter, i.e., the diameter of an agglomerate formed of a plurality of particles (primary particles). Oxide units of the cathode active material agglomerate depending on set conditions of the production process to form an agglomerate and this agglomerate exerts active material properties per se. Accordingly, more specifically, the mean particle diameter of the oxide means a particle diameter of the agglomerate.

The oxide of Formula 2 may be a composite with a layered structure or a solid solution with a layered structure.

In the present invention, a mix ratio of the two composite oxides may be a weight ratio of 50:50 to 99:1, specifically 80:20 to 95:5 and more specifically, 80:20 to 90:10. The mix ratio may be an optimal range to exert desired levels of effects. In particular, when the composite oxide of Formula 2 is present in an excessively low amount, desired capacity and safety levels cannot be disadvantageously obtained.

The present invention provides a secondary battery comprising the cathode active material.

Specifically, the secondary battery may comprise a lithium metal oxide represented by the following Formula 5 as an anode active material:

$$Li_aM'_bO_{4-c}A_c \qquad (5)$$

wherein M' is at least one element selected from the group consisting of Ti, Sn, Cu, Pb, Sb, Zn, Fe, In, Al and Zr;

a and b are determined according to an oxidation number of M' within ranges of $0.1 \leq a \leq 4$ and $0.2 \leq b \leq 4$;

c is determined according to an oxidation number of A within a range of $0 \leq c < 0.2$; and A is at least one monovalent or bivalent anion.

The lithium metal oxide is represented by the following Formula 6:

$$Li_aTi_bO_4 \qquad (6)$$

wherein $0.5 \leq a \leq 3$ and $1 \leq b \leq 2.5$.

The lithium metal oxide may be $Li_{1.33}Ti_{1.67}O_4$ or $LiTi_2O_4$.

As compared to graphite, lithium titanium oxide has a higher potential than lithium, and does not cause precipitation of reaction products with an electrolyte and lithium at the interface, thus providing superior safety. However, when lithium titanium oxide is used in combination with conventional cathode active materials such as lithium cobalt oxide, since the potential thereof is about 1.5V higher than that of lithium, fabricated battery cells have a decreased discharge voltage of about 2.4V, a similar theoretical capacity to graphite (175 mAh/g), and limited improvement in energy density.

Accordingly, in the present invention, the secondary battery maintains a high voltage in spite of using lithium titanium oxide as an anode active material by using the cathode active material defined above, thus exerting superior capacity and power.

A method for preparing the oxide as defined above is well-known in the art and a detailed explanation thereof is thus omitted.

The secondary battery according to the present invention comprises a cathode produced by applying a mixture containing a cathode active material, a conductive material and a binder to a cathode current collector, followed by drying and pressing, and an anode produced by the same method as the cathode. In this case, the mixture may further comprise a filler, as necessary.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component enhancing binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubber and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

Examples of the anode active material may include carbon such as non-graphitized carbon and graphitized carbon; metal composite oxides such as $Li_xFe_2O_3(0 \leq x \leq 1)$, $Li_xWO_2$ $(0 \leq x \leq 1)$ and $Sn_xMe_{1-x}Me'_yO_z$(Me: Mn, Fe, Pb, Ge; Me': Al, B, P, Si, Group I, II and III elements of the Periodic Table, halogen atoms; $0 < x \leq 1$; $1 \leq y \leq 3$; and $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials and titanium oxides. Specifically, lithium titanium oxide as defined above may be used.

The secondary battery may have a structure in which a lithium salt-containing electrolyte is impregnated into an electrode assembly having a structure in which a separator is interposed between the cathode and the anode.

The separator is interposed between the cathode and the anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing, non-aqueous electrolyte is composed of an electrolyte and a lithium salt. Examples of the electrolyte include, but are not limited to, a non-aqueous organic solvent, an organic solid electrolyte and an inorganic solid electrolyte.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$-$LiI$-$LiOH$, $LiSiO_4$, $LiSiO_4$-$LiI$-$LiOH$, $Li_2SiS_3$, $Li_4SiO_4$, $Li_4SiO_4$-$LiI$-$LiOH$ and $Li_3PO_4$-$Li_2S$-$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. if necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS) and the like.

For example, the lithium salt-containing non-aqueous electrolyte can be prepared by adding a lithium salt such as $LiPF_6$, $LiClO_4$, $LiBF_4$, and $LiN(SO_2CF_3)_2$, to a mixed solvent of a cyclic carbonate such as EC or PC as a highly dielectric solvent and a linear carbonate such as DEC, DMC or EMC as a low-viscosity solvent.

The present invention provides a battery module comprising the secondary battery as a unit battery and a battery pack comprising the battery module.

The battery pack may be used as a power source for medium to large devices requiring high-temperature stability, long cycle properties and high rate properties.

Preferably, examples of the medium to large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like. As well known in the art (e.g., US2009/0123842 or US2007/0099087), the secondary battery in the large device may have a capacity over 5 Ah.

Effects of the Invention

As apparent from the fore-going, the cathode active material according to the present invention comprises a combination of a lithium manganese composite oxide having a predetermined spinel structure and a specific oxide, thus exerting superior lifespan, and exhibiting considerably improved capacity and safety, although lithium titanium oxide is used as an anode active material.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing variation in voltage and temperature as a function of time with respect to a battery having passed needle penetration testing in Experimental Example 2 of the present invention; and FIG. 2 is a graph showing variation in voltage and temperature as a function of time with respect to a battery having failed needle penetration testing in Experimental Example 2 of the present invention.

DETAILED DESCRIPTION OF THE INVENTION

Now, the present invention will be described in more detail with reference to the following examples. These examples are provided only to illustrate the present invention and should not be construed as limiting the scope and spirit of the present invention.

EXAMPLE 1

An oxide of $LiNi_{0.5}Mn_{1.5}O_4$ was mixed with an oxide of $0.6Li_2MnO_3.0.4LiMnO_2$ at a weight ratio of 90:10 to prepare a cathode active material and 90% by weight of the cathode active material, 5% by weight of Super-P (conductive material) and 5% by weight of PVdF (binder) were added to NMP to prepare a cathode mix.

COMPARATIVE EXAMPLE 1

A cathode mix was prepared in the same manner as in Example 1, except that only $LiNi_{0.5}Mn_{1.5}O_4$ was used as the cathode active material.

EXPERIMENTAL EXAMPLE 1

Each of the cathode mixes prepared in Example 1 and Comparative Example 1 was applied to an aluminum current collector to produce a cathode for secondary batteries. 90% by weight of $Li_{1.33}Ti_{1.67}O_4$, 5% by weight of Super-C (conductive material) and 5% by weight of PVdF (binder) were added to NMP to prepare an anode mix, and the anode mix was applied to an aluminum current collector, followed by drying and pressing, to produce an anode. An electrode assembly was produced using the cathode, the anode and a porous separator made of polypropylene. Then, the electrode assembly was inserted into a pouch, a lead line was connected thereto, a solution of 1M $LiPF_6$ in a mixed solvent consisting of ethylene carbonate (EC), dimethyl carbonate (DMC) and ethyl methyl carbonate (EMC) at a volume ratio of 1:1:1 was injected as an electrolyte and sealed to assemble a 9 bicell-type lithium secondary battery. Capacity of the battery was measured under 0.1C charge and discharge conditions and is shown in Table 1 below.

TABLE 1

|  | Capacity (mAh) |
|---|---|
| Ex. 1 | 596 |
| Comp. Ex. 1 | 584 |

As can be seen From Table 1 above, the battery of Example 1 exhibited superior capacity, as compared to the battery of Comparative Example 1.

EXPERIMENTAL EXAMPLE 2

Each of the cathode mixes prepared in Example 1 and Comparative Example 1 was applied to an aluminum current collector to produce a cathode for secondary batteries. 90% by weight of $Li_{1.33}Ti_{1.67}O_4$, 5% by weight of Super-C (conductive material) and 5% by weight of PVdF (binder) were added to NMP to prepare an anode mix, and the anode mix was applied to an aluminum current collector, followed by drying and pressing, to produce an anode. An electrode assembly was produced using the cathode, the anode and a porous separator made of polypropylene. Then, the electrode assembly was inserted into a pouch, a lead line was connected thereto, a solution of 1M $LiPF_6$ in a mixed solvent consisting of ethylene carbonate (EC), dimethyl carbonate (DMC) and ethyl methyl carbonate (EMC) at a volume ratio of 1:1:1 was injected as an electrolyte and sealed to produce a lithium secondary battery.

20 lithium secondary batteries including the produced lithium secondary battery were obtained and subjected to needle penetration testing. The number of lithium secondary batteries passing needle penetration testing is shown in Table 2 and needle penetration testing results are shown in FIGS. 1 and 2.

Needle penetration testing was carried out by penetrating a nail with a diameter of 3 mm at a rate of 8 cm/s into a center of the battery.

TABLE 2

|  | Ex. 1 | Comp. Ex. 1 |
|---|---|---|
| Number of batteries passing needle penetration test | 19 | 14 |

As can be seen from Table 2 above, the number of me batteries passing needle penetration testing obtained in Example 1 according to the present invention was greater as compared to Comparative Example 1. Accordingly, the batteries of Example 1 could secure superior safety, as compared to Comparative Example 1.

As can be seen from FIG. 1, the battery having passed needle penetration testing exhibited broad variation in temperature and voltage as a function of time. On the other hand, as can be seen from FIG. 2, the battery having failed needle penetration testing exhibited a sharp increase in temperature and a sharp voltage drop as a function of time.

Accordingly, the battery of Example 1 exhibited superior safety and performance as compared to that of Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A device, which is an electric vehicle, a hybrid electric vehicle, a plug-in hybrid electric vehicle or a power storage system, said device comprising a battery pack, which comprises a battery module, which comprises a secondary battery, said secondary battery comprising:

a cathode active material; and
an anode material,
wherein the cathode active material comprises a combination of lithium manganese composite oxide with a spinel structure represented by the following Formula 1 and a specific oxide represented by the following Formula 2, the cathode active material having a broad potential region (potential plateau) at 3.0 to 4.8V upon initial charge:

$$Li_xM_yMn_{2-y}O_{4-z}A_z \quad \text{Formula 1}$$

wherein 0.9≤x≤1.2, 0<y<2, and 0≤z<0.2;
M is at least one element selected from the group consisting of Al, Mg, Ni, Co, Fe, Cr, V, Ti, Cu, B, Ca, Zn, Zr, Nb, Mo, Sr, Sb, W, Ti and Bi; and
A is at least one monovalent or bivalent anion, $$y'Li_2M'O_3 \cdot (1-y')LiM''O_{2-z'}A'_{z'} \quad \text{Formula 2}$$

0<y'<1 and 0≤z'<0.2;
M' is at least one element selected form the group consisting of Mn, Sn and Zr having an oxidation number of +4;
M" is at least one element selected from the group consisting of Period I and II transition metals, including Ni, Mn and Co, which have a 6-coordination structure and are stable in a layered structure; and
A' is at least one monovalent or bivalent anion,
wherein the oxide of Formula 1 is comprised of secondary particles having a mean particle diameter (D50) of 2 to 30 μm,
wherein the oxide of Formula 2 is a composite with a layered structure or a solid solution with a layered structure,
wherein the oxide of Formula 1 is mixed with the oxide of Formula 2 in a weight ratio of 80:20 to 95:5, and
wherein the anode active material is a lithium metal oxide represented by the following Formula 6:

$$Li_aTi_bO_4 \quad (6)$$

wherein 0.5≤a≤3 and 1≤b≤2.5.

2. The device according to claim 1, wherein the oxide of Formula 1 is represented by the following Formula 3:

$$Li_xNi_yMn_{2-y}O_4 \quad (3)$$

wherein $0.9 \leq x \leq 1.2$, and $0.4 \leq y \leq 0.5$.

3. The device according to claim 2, wherein the oxide of Formula 3 is $LiNi_{0.5}Mn_{1.5}O_4$ or $LiNi_{0.4}Mn_{1.6}O_4$.

4. The device according to claim 1, wherein the oxide of Formula 2 is represented by the following Formula 4:

$$z'Li_2MnO_3 \cdot (1-z')LiM''O_2 \quad (4)$$

wherein $0.5 < z' < 1$, and M″ is at least one element selected from the group consisting of Period I and II transition metals, including Ni, Mn and Co, which have 6-coordination structure and are stable in a layered structure.

5. The device according to claim 1, wherein the oxide of Formula 1 is mixed with the oxide of Formula 2 in a weight ratio of 80:20 to 90:10.

6. The device according to claim 1, wherein the lithium metal oxide of Formula 6 is $Li_{1.33}Ti_{1.67}O_4$ or $LiTi_2O_4$.

7. The device according to claim 1, wherein the secondary battery is a lithium secondary battery.

8. The device according to claim 1, wherein M′ is Sn.

9. The device according to claim 1, wherein M′ is at least one element selected from the group consisting of Sn and Zr having an oxidation number of +4; and wherein M″ is at least one element selected from the group consisting of Period I and II transition metals, including Ni and Co, which have a 6-coordination structure and are stable in a layered structure.

10. The device according to claim 1, wherein $0 < z < 0.2$.

* * * * *